(No Model.) 2 Sheets—Sheet 2.
F. P. LUND.
COMBINED ROLLER AND ICE SKATE.
No 566,271. Patented Aug. 18, 1896.
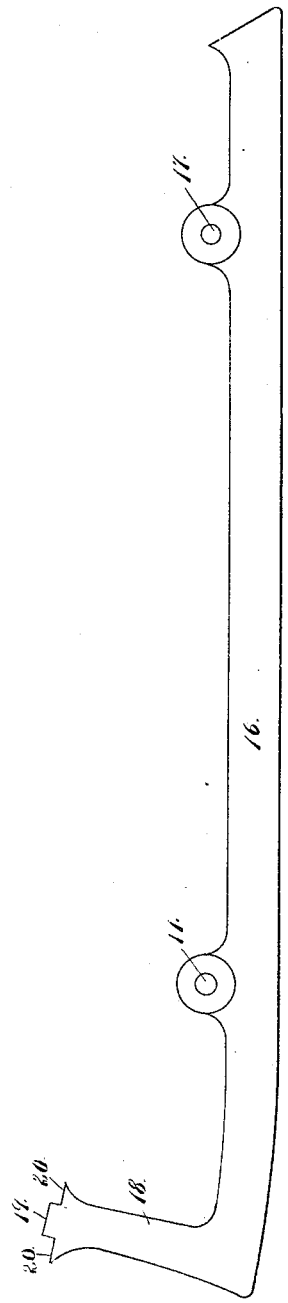
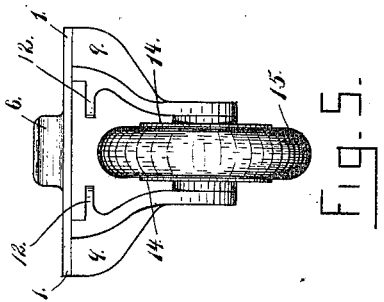
Fig. 5.
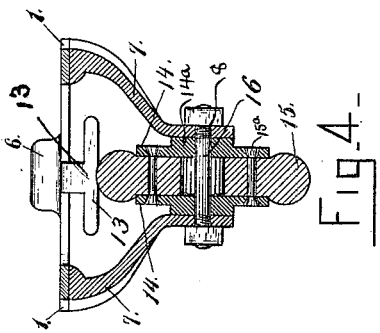
Fig. 4.
Witnesses
F. P. Kirsten
C. B. Dulter
Inventor:
Franklin P. Lund
by W. T. Miller
Attorney.

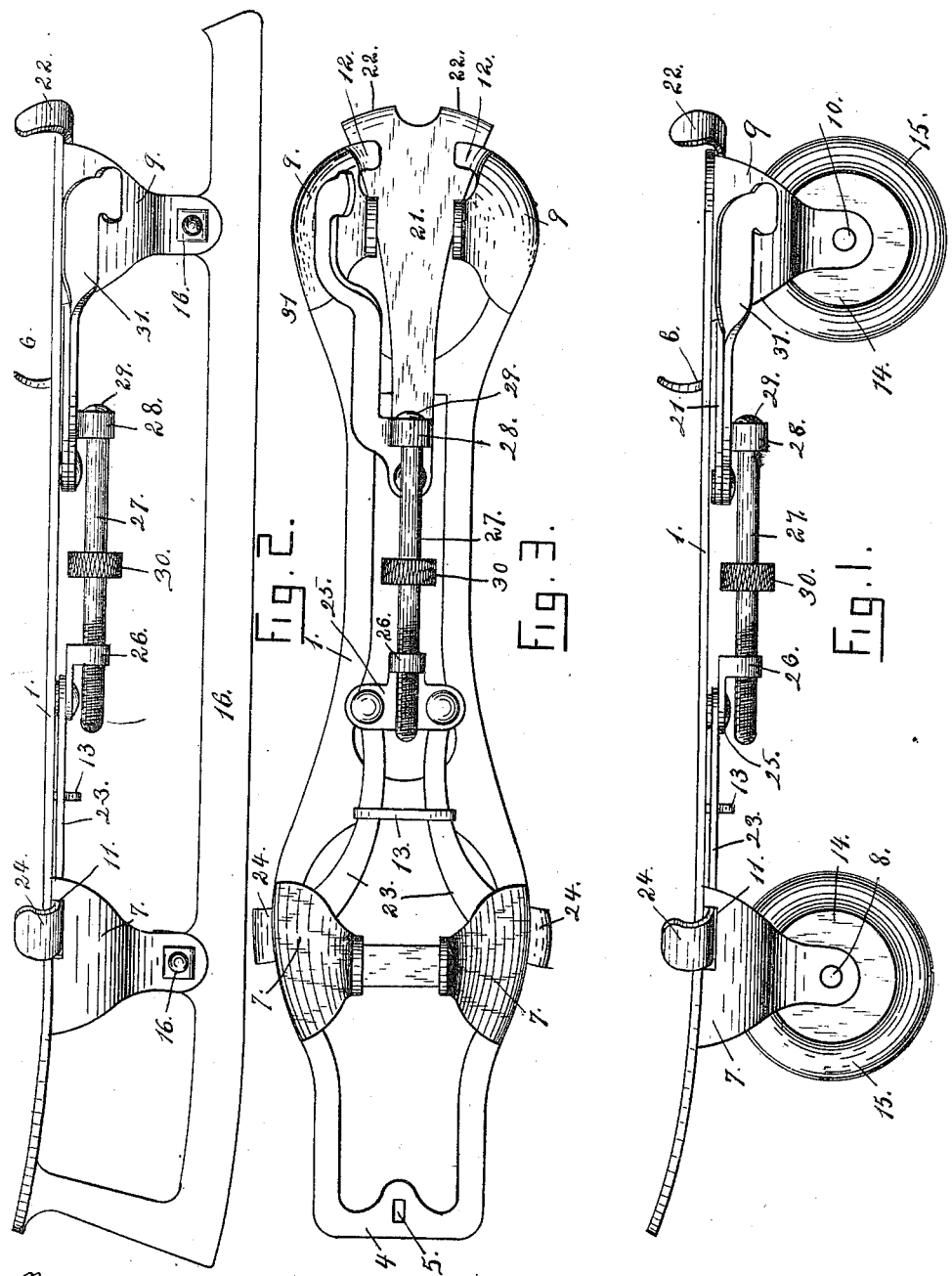

United States Patent Office.

FRANKLIN P. LUND, OF BUFFALO, NEW YORK.

COMBINED ROLLER AND ICE SKATE.

SPECIFICATION forming part of Letters Patent No. 566,271, dated August 18, 1896.

Application filed May 21, 1895. Serial No. 550,049. (No model.)

*To all whom it may concern:*

Be it known that I, FRANKLIN P. LUND, a citizen of the United States, residing at Buffalo, in the county of Erie and State of New York, have invented certain new and useful Improvements in a Combined Roller and Ice Skate; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of my invention is to provide a combination roller and ice skate, or, in other words, a skate-frame of improved construction adapted for the interchangeable reception of a pair of rollers or wheels of novel construction or a runner specially adapted for removable attachment to the frame.

To that end my invention consists in the specific construction hereinafter described.

I will now describe the manner in which I have carried out my invention and then claim what I believe to be novel.

In the drawings, Figure 1 is a side elevation of my improved skate-frame with single rollers mounted thereon in front and rear. Fig. 2 is a similar elevation showing the ice-runner attached. Fig. 3 is an under side view of the skate-frame without rollers or ice-runner. Fig. 4 is a vertical transverse section of Fig. 1, taken through the front roller, with the clamps removed and looking toward the rear of the skate. Fig. 5 is a rear elevation of Fig. 1 with the clamps removed, and Fig. 6 is a side elevation of the ice-runner detached.

Referring to the drawings, 1 is the plate forming the body of the skate-frame, having open spaces cut away to reduce the weight of the frame. In the cross-piece 4 in the forward end of the plate 1 is cut the longitudinal slot 5, and 6 is a rearwardly-curved integral prong upon the plate 1 at the edge of one of the openings, adapted for engagement with the breast of the heel.

Upon the front portion of the plate 1, on each side thereof, are the two similarly-shaped downwardly-extending wings 7 7, which curve or extend inwardly and are provided at their lower ends with circular apertures 8. (See Fig. 4.) Similar wings 9 9 project downwardly from the rear end of the plate 1, their lower ends being provided with circular apertures 10. In the wings 7 7 are the slots 11, just under the edge of the plate 1, and the wings 9 9 are provided upon their rear inner edges with the inwardly-extending lugs or guides 12 12 a short distance below the under surface of the plate 1, as clearly shown in Fig. 5. A T-shaped hanger or guide 13 is located on the under side of the plate 1, along the rear edge of one of the openings, as shown in Fig. 3.

The construction just described forms my improved skate-frame, which, as shown in Figs. 1, 4, and 5, is provided with two rollers, one in front and one in the rear. These rollers are preferably constructed of the metallic circular side plates 14, thickened on their outer faces at their centers, as at 14ª, so as to produce hubs to rest against the inner faces of their bearings, and between such plates are tightly clamped by the rivets 15ª washers of rubber or other elastic and non-slipping material, the clamping of the body thereof between the plates causing the radial edges which project beyond the plates, as at 15, to bulge into a surrounding tire approximately cylindrical in cross-section and not so tightly compressed as the body between the plates. On this tire the skater moves, and, at whatever angle the skate is held to the surface, the rounded face of the tire takes a firm hold thereon to prevent slipping and present a yielding and noiseless support. These rollers are removably secured in the wings 7 7 and 9 9 by the bolts 16, which are passed through the apertures 8 and 10 in the wings and through the hubs 14 of the rollers, forming axles upon which the rollers are permitted to freely revolve. This forms my improved roller-skate. This form of skate is specially adapted for use upon smooth asphalt pavements as a means of locomotion between distant points. It is constructed for easy and rapid travel, as the surface of contact of the rubber tires 15 is very small (they being rounded off for the purpose) as compared with the broad tread of the pair of wood rollers employed with the present skate, and in addition thereto there is no side slip, as is the case with the wood rollers.

As shown detached in Fig. 6, 16 is an ice-runner adapted for interchangeable use with the rollers upon my improved skate-frame. It is provided with the two horizontal transverse sockets 17 17, adapted for the reception of the same bolts or axles 16 which secure the rollers in position. After the rollers have been removed the sockets 17 17 of the runner 16 are placed between the front and rear wings 7 7 and 9 9, and are there removably secured by the bolts or axles 16, as shown in Fig. 2. The front support 18 of the runner has upon its upper end the extension 19, adapted for engagement with the longitudinal slot 5 in the plate 1, the upper edge 20 resting against the under surface of the plate 1, thereby forming a bearing for the same, the extension 19 acting as a brace to hold the forward end of the runner securely in position. In this manner I am enabled with the construction hereinbefore described to provide both a roller and ice skate at a cost very little greater than that of either a roller or ice skate alone.

The clamping device which I have employed is practically of old and well-known form and is applied to my improved skate-frame as follows: The rear movable plate 21, carrying the clamps 22, which engage with the back of the heel, is not slotted as in the old form for sliding engagement with projecting rivets secured to the plate, but passes under and is loosely, but movably, confined by the lugs or guides 12 12 upon the wings 9 9. This change in construction involves less expense and is equally reliable. The two pivoted curved arms 23 23 pass loosely through the slots 11 in the wings 7 7, the sole-clamps 24 24 extending above the plate 1. The arms 23 are held loosely, but movably, against the under surface of the plate 1 by the wings of the T-shaped hanger or guide 13. The arms 23 are pivoted to a plate 25, which carries the nut 26, adapted for screw-threaded engagement with the rod 27, which passes loosely through the socket 28, its head 29 preventing its withdrawal therefrom. The milled annular flange 30 is used to adjust the position of the rod 27 in the nut 26. The adjusting-lever 31 is pivoted to the plate 21 and carries the socket 28 a short distance to the rear of its pivot. It will thus be seen that the sole and heel clamps 22 24 are held in operative and adjustable position upon the under side of the plate 1 without the necessity of any riveting upon such plate; thus materially reducing the cost of construction.

I claim—

In a skate, the combination with the body-plate, the front depending and converging wings having slots just under said plate, the similar rear wings having at their rear edges inwardly-projecting lugs, and the rollers or a runner interchangeably held between the lower ends of said wings; of the curved arms passing through said slots and having sole-clamps, the rear plate passing above said lugs and having heel-clamps, and means for drawing such arms and rear plate toward each other when desired, as and for the purpose set forth.

In testimony whereof I have signed my name to this specification in the presence of two subscribing witnesses.

FRANKLIN P. LUND.

Witnesses:
 THOS. HENDERSON,
 W. T. MILLER.